United States Patent Office 3,130,229
Patented Apr. 21, 1964

---

3,130,229
METHOD FOR THE MANUFACTURE OF ACRYLAMIDE
Ralph E. Friedrich, Giffin D. Jones, and Suzanne N. Heiny, Midland, Mich., assignors to The Dow Chemical Company, Midland, Mich., a corporation of Delaware
No Drawing. Filed Feb. 6, 1961, Ser. No. 87,061
5 Claims. (Cl. 260—561)

The present invention concerns an improved method for the manufacture of $\alpha,\beta$ ethylenically unsaturated amides such as acrylamide and methacrylamide and is more particularly directed to the production of such amide monomers free of difunctional cross-linking impurities.

Of special interest is acrylamide monomer since in recent years, an increasing number of uses, such as soil conditioning, flocculation of mineral suspensions and thickening aqueous systems, have been suggested for water-soluble acrylamide polymers, high molecular weight polymers being generally preferred.

As a starting material for such polymers, acrylamide monomer has commonly been prepared by the acid hydrolysis of acrylonitrile. Normally, monomers prepared in this manner contain cross-linking impurities which tend to render polymers produced therefrom insoluble in water. This water-insolubilization of or cross-linking within the resulting polymer becomes increasingly manifest as the polymerization reaction is carried out at higher monomer concentrations.

While the present invention is in no way predicated upon an accurate characterization of these cross-linking impurities, it is believed that they consist, at least in part, of greater or lesser amounts of (1)
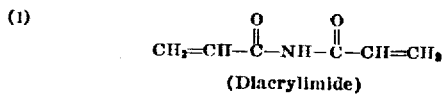
(Diacrylimide)

and (2)
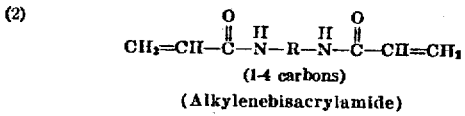
(1-4 carbons)
(Alkylenebisacrylamide)

Direct experimental evidence for the above conclusions is difficult to obtain due to the difficulty of analyzing for the small quantities of the impurities involved. However, it is known that the production of the first of the above-mentioned materials is promoted by acids and heat. Such conditions occur during the hydrolysis of acrylonitrile. The second is believed to be obtained as a result of a reaction between two amide molecules and an aldehydic molecule. Aldehydes are normally found in trace amounts in commercially available acrylonitrile and they may also be formed as a result of a side oxygenation reaction of the nitrile during the hydrolysis reaction at elevated temperatures.

The imide impurity is readily eliminated from an $\alpha,\beta$ unsaturated amide monomer composition by subjecting it to mild hydrolyzing conditions. Preferably, such an operation is carried out just prior to the polymerization of the monomer. While a substantial proportion of the potential cross-linking impurities are effectively removed in this manner, there still remains, however, a sufficient quantity of cross-linking impurities in the monomer composition to hinder the production of linear, high molecular weight polymers. In the instance of high molecular weight polymers of acrylamide prepared in polymerization systems utilizing monomer concentrations above about 10 percent by weight of the system, such cross-linking impurities are manifested by the formation of water-insoluble polymers.

Based upon an assumption of the existence of the second of the above-described cross-linking impurities, a series of experiments was devised to ascertain the criticality of the presence of such monomers in acrylamide.

Essentially these experiments involved polymerizing a purified acrylamide monomer in an aqueous solution at specified monomer concentrations. At each monomer concentration, a series of aliquot runs were made in which a range of different proportions of methylenebisacrylamide (MBA) were added to the polymerization system. In this manner, the other conditions of polymerization having been maintained identical in all runs, the maximum amount of such a cross-linking impurity that could be tolerated before obtaining a cross-linked polymer was determined. The terminology "cross-linked" as employed in the present specification and claims means that the polymer composition is water-insoluble, which, in turn, means that the polymer will not disperse in water to form a homogeneous phase infinitely dilutable with additional water. The results of this series of experiments are set forth in the following Table 1.

TABLE 1

| Acrylamide Concentration in Polymerization System, percent by weight | Minimum Concentration of MBA to Cause Gelling (Crosslinked) Polymer), parts per million based on acrylamide |
|---|---|
| 5 | 250 |
| 10 | 50 |
| 20 | 10 |
| 30 | 5 |
| 50 | 2 |

From the foregoing, it is evident that exceedingly small concentrations of such a cross-linking impurity can exert a critical influence on the course of the polymerization reaction. In fact, it will be observed that the amount of cross-linker required to gel or cross-link the resulting polymer is an inverse square function of the monomer concentration, i.e., $$[MBA] = \frac{k}{[M]^2}$$

wherein [MBA] is the concentration of the difunctional MBA monomer, [M] is the concentration of the amide monomer and $k$ is a constant for the system.

It is a principal object of the present invention to provide a novel process for the manufacture of acrylamide and its $\alpha$ substituted derivatives. It is especially an object to provide acrylamide free of cross-linking impurities. It is still a further object to provide improved acrylamide and $\alpha$ substituted derivatives thereof which are capable of polymerization at high monomer concentrations to provide linear high molecular weight polymers. Other objects and benefits will become manifest hereinafter as the invention is more fully described.

In accordance with the invention, it was discovered that in a process for the hydrolysis of acrylonitrile, or an $\alpha$ substituted derivative thereof, to the corresponding amide comprising reacting the nitrile with concentrated sulfuric acid at a temperature from about 50° to about 110° C. and in the presence of a polymerization inhibitor to provide the corresponding amide sulfate, a highly efficacious improvement consists in conducting the hydrolysis under a substantially oxygen-free atmosphere and in the presence of (a) a sufficient amount of a phenolic compound, as hereinafter described, to scavenge any aldehydes present and (b) a sufficient amount of ferrous ions to inhibit polymerziation within the reaction mass.

Upon completion of the hydrolysis reaction, the acrylamide sulfate or α substituted derivative thereof, produced is substantially freed of sulfuric acid in any suitable fashion as, for example, by liming or by ion exclusion methods such as those taught by G. D. Jones in United States Letters Patent 2,734,915.

The resulting product, if in the form of an aqueous solution such as is obtained in accordance with the ion exclusion procedure indicated above, may be concentrated to produce any desired solution concentration of the amide monomer. Such monomer solutions may be employed directly in a polymerization system or further evaporated to provide a solid monomer substantially free of cross-linking impurities. Other methods involving neutralizing the acrylamide sulfate and separating the resulting amide monomer from the neutralized composition are taught in the art. See, for example, United States Letters Patent 2,683,173.

The amide monomers prepared in accordance with the present invention can be employed to prepare linear, i.e., substantially free of cross-linking, high molecular weight polymers. The terminology "high molecular weight" is exemplified, as in the instance of polyacrylamide prepared from acrylamide obtained in accordance with the above procedure, by dilute solution viscosities of the polymer in water of at least about 5 centipoises. The terminology "dilute solution viscosity" as employed herein refers to the viscosity of an aqueous solution containing 0.5 percent by weight of a water-soluble acrylamide polymer, the measurements being made at pH 3 and at a temperature of 25° C. with an Ostwald viscosimeter. Viscosities above 70 cps. are common when monomer prepared in accordance with the process of the invention is employed. The latter viscosity corresponds to a molecular weight of at least about 8,000,000.

Phenolic compounds operable in the present invention have at least one ring position substituted with an active hydrogen and are at least slightly soluble in the α,β ethylenically unsaturated nitrile employed. Specific phenolic compounds employed include monohydroxy, dihydroxy and trihydroxy benzenes and halogen and alkyl derivatives thereof, provided that at least one position on the benzene ring, either ortho or para to one of the hydroxyl groups, is substituted only with hydogen. Similarly, quinones, such as benzoquinones which are reduced to the corresponding hydroxy compounds during hydrolysis reaction, may be utilized, provided the phenolic compounds so produced in situ have the aforementioned active ortho or para positions. The amount of the phenolic compound incorporated into the reaction mixture is sufficient to scavenge any aldehydes present in the nitrile. Quantities generally effective for this purpose may vary from about 50 up to as much as about 2,000 parts per million of the phenolic compound based on the weight of the nitrile. Preferably, the amount employed ranges from about 100 to 1,000 parts per million.

The ferrous ion can be provided in any convenient manner such as a ferrous salt of a mineral acid or as iron powder which is converted to the ferrous ion in the presence of the acid employed to accomplish the hydrolysis. Above a certain minimal limit sufficient to achieve effective inhibition, the concentration of the ferrous ions in the reaction mixture is not critical. Usually, at least about 50 parts per million based on the weight of the reaction mixture of ferrous ions are sufficient. If desired, the amount of ferrous ion used may be as much as 2 or more percent by weight of the reaction mixture.

In one mode of carrying out the invention, a sufficient amount of the phenolic compound to scavenge any aldehydes present is dissolved in acrylonitrile or an α substituted derivative thereof, and the resulting solution is deaerated by purging it with nitrogen. This solution is then added slowly with good mixing to sulfuric acid monohydrate under an atmosphere substantially freed of oxygen, said acid containing an effective quantity of a previously added ferrous ion source. The addition rate of the nitrile to the acid is controlled so as to avoid achieving temperatures in the reaction mixture of over 100° C. Upon completion of the addition of the nitrile to the acid, the reaction mixture is heated at a temperature from about 50° up to 110° C. for a period of time sufficient to substantially convert the nitrile to an amide.

The reaction mixture should contain at least one mole of water and up to as much as 1.4 moles of water per mole of sulfuric acid. At least one mole of sulfuric acid per mole of acrylonitrile is added. Good results are obtained by employing a slight excess of about 1.1 moles of sulfuric acid and about 1.1 moles of water per mole of acrylonitrile. Upon completion of the reaction achieved by heating the reaction mixture, the reaction mass is cooled to a temperature below 50° C., preferably as low as 20° to 30° C. At this point, the reaction mass may again be exposed to an oxygen-containing atmosphere. Subsequently any convenient or desired procedure for the neutralization of the sulfuric acid and separation of the amide monomer may be employed.

Though ferrous ions initially added to the reaction mixture are effective polymerization inhibitors in the absence of oxygen, best results are obtained with the monomer composition produced in accordance with the improved method of the invention, if before exposing the monomer composition to oxygen, another polymerization inhibitor is added to the reaction mass. Preferably, such an inhibitor is added to the monomer during the period in which the reaction mass is being cooled subsequent to completion of the hydrolysis reaction. A highly effective inhibitor for this purpose is the cupric ion which may be provided as cupric sulfate or copper powder which is converted to cupric sulfate upon its addition to the amide-sulfate composition.

The present invention is further illustrated by the following examples.

*Example 1*

To a reaction vessel equipped with a stirrer, heating manifold and means for accomplishing deaeration of the vessel's contents by purging with nitrogen and maintaining them under such an inert atmosphere, was charged 106 grams of water, 2.58 grams of commercial ferrous sulfate ($FeSO_4 \cdot 7H_2O$) and 0.295 gram of powdered iron. To this solution was added 924 grams of aqueous 95 percent sulfuric acid. The reaction system was then purged with nitrogen. Next, 443 grams of commercial acrylonitrile having dissolved therein 0.222 gram of resorcinol (500 parts per million) was added dropwise to the stirred acid solution. The acrylonitrile composition had also been previously purged with nitrogen.

During the course of the addition of the acrylonitrile, the rate of addition was adjusted so as to maintain the temperature level of the reaction system at about 85° C. Upon completion of the addition of the acrylonitrile mixture, the reaction system was heated for 2 hours at 85° C. and subsequently cooled to approximately 65° C. The reaction product was then mixed with 2,310 grams of deaerated water containing 2 grams of cupric sulfate pentahydrate (a preferred polymerization inhibitor). Having achieved a homogeneous composition, the solution was permitted to come into contact with air. Dilution of a portion of the acrylamide sulfate thus produced in ethanol gave a clear solution which indicated that no polymer had formed during the hydrolysis reaction.

The aqueous solution of acrylamide sulfate was passed through an ion exchange bed 6 feet long x 3 inches in diameter, containing the acid form of a commercial sulfonate-type cation exchange resin to separate the acrylamide from most of the sulfuric acid by ion exclusion. The resin bed was washed with water to elute the acrylamide whereby the latter was recovered in the form of an approximately 10 percent aqueous solution. The acrylamide monomer solution thus obtained was passed through activated charcoal to remove residual resorcinol.

Any sulfuric acid remaining in the acrylamide solution thus obtained was neutralized by the addition of sodium hydroxide in an amount sufficient to achieve a pH of about 11. The basic monomer solution was then heated at 85° C. for about 30 minutes in order to hydrolyze potential imide cross-linking agents. Subsequently, the solution was acidified to a pH of 5 with the addition of sulfuric acid and to the resulting solution was added sodium acetate as a buffer in the amount of 1 percent based on the acrylamide. The dilute aqueous solutions of acrylamide thus prepared were concentrated by vacuum drying to desired monomer levels for subsequent polymerization.

To an aqueous solution containing 29.5 percent by weight of the above-prepared acrylamide monomer was added 1,000 parts per million of tetrasodium ethylenediamine tetraacetate and 0.5 percent by weight of the monomer of tertiary-butyl hydroperoxide. The resulting solution was adjusted to a pH of 5.0, deaerated with nitrogen and sealed in an ampoule wherein it was maintained at 70° C. for 16 hours. The resulting polymer gel dissolved in water to provide a dilute solution viscosity (0.5 percent by weight of the polymer) of 33.6 centipoises at a pH of 3.0.

In a second run carried out in a manner identical to that of the foregoing except that 250 parts of resorcinol were employed as the scavenger, a high molecular weight polyacrylamide was obtained which gave a dilute solution viscosity of 50.5 centipoises at a pH of 3.

Example 2

An acrylamide sulfate monomer was prepared in a manner identical to that employed in Example 1 except that no iron powder was employed in addition to the ferrous sulfate inhibitor.

Having obtained the acrylamide sulfate, the intermediate imide hydrolysis step was conducted at a pH of 12 for 0.75 hour at 85° C. Subsequently, the acrylamide monomer, obtained from the amide sulfate product of the hydrolysis reaction by means of the ion exclusion procedure indicated in Example 1, was passed through an ion exchange bed, 12 inches long x 0.5 inch in diameter, containing an anion exchange resin having a chloride anion to remove residual resorcinol.

Polyacrylamide prepared in accordance with the polymerization procedure of Example 1 from the acrylamide monomer of this run gave a dilute solution viscosity in water of 75 centipoises at a pH of 3.

Example 3

In a series of runs identical to that of Example 2, acrylamide monomer was prepared employing a number of different phenolic compounds. Resorcinol was employed in the amount of 500 parts per million based on the acrylonitrile while the other phenolics were employed in equivalent molar quantities based on the resorcinol.

The polymers prepared in accordance with the procedure of the foregoing examples from the acrylamide monomers obtained from each run were dissolved in a dilute salt solution (containing 1 percent sodium chloride by weight) and the viscosity of the resulting solutions determined.

The control polyacrylamide polymer was prepared from acrylamide monomer produced by means of a procedure identical to that of Example 2 except that no phenolic compound was added as a scavenger. The results of these runs are reported in the following Table 2:

TABLE 2

| Phenolic Additive | Monomer Concentration [1] | | Polymer Viscosity [2] | |
|---|---|---|---|---|
| | Conc./Vis. | Conc./Vis. | Conc./Vis. | Conc./Vis. |
| Control | 29.8/XL | 20.2/XL | 15.4/XL | 10.2/46.9 |
| Hydroquinone | 29.5/XL | 18.7/XL | 14.6/40.4 | 9.5/28.6 |
| Phenol | 30.0/XL | 20.2/XL | 14.6/44.4 | 10.4/33.2 |
| p-Cresol | 29.9/XL | 19.7/XL | 15.6/59.0 | 10.2/40.4 |
| Phloroglucinol | 31.5/46.9 | 19.7/47.8 | 14.6/45.8 | 9.9/35.6 |
| Resorcinol | 30.2/50.9 | 20.1/51.8 | 14.9/43.3 | 10.2/34.2 |

[1] Monomer concentration is the percent by weight of acrylamide in the aqueous polymerization system.
[2] Viscosity values were determined for compositions of 0.5 percent by weight of the polymer in an aqueous 1 percent sodium chloride solution adjusted to pH 3, as obtained with an Ostwald viscosimeter at 25° C. The letters XL indicate the resulting polymer was cross-linked and water-insoluble.

It is readily observed from the foregoing that while generally beneficial results are obtained with any member of the described class of phenolic compounds of which the above examples are representative, that highly efficacious and surprising results are achieved with the two species phloroglucinol and resorcinol.

In a manner similar to that employed in Example 1, other phenolic compounds such as 3,5-xylenol, m-cresol, 2,3,5-trimethylphenol, 3,4-xylenol, 2,5-xylenol, saligenin and o-cresol can be substituted for the resorcinol to produce acrylamide monomer substantially free of crosslinking impurities formed by chemical reactions between aldehydes and acrylamide.

What is claimed is:

1. In a process for hydrolyzing acrylonitrile to acrylamide sulfate which comprises the steps of reacting acrylonitrile with concentrated sulfuric acid at a temperature within the range from about 50° to about 110° C. and in the presence of a polymerization inhibitor for the system whereby acrylamide sulfate is produced, the improvement which consists in conducting said hydrolysis reaction under an atmosphere substantially free of oxygen in the presence of (1) from about 50 up to about 2000 parts per million of a phenol based on the weight of the acrylonitrile, said phenol being soluble in the acrylonitrile and having at least one of the ring positions ortho and para to a hydroxy group occupied by a hydrogen atom and (2) a sufficient quantity of ferrous ions to inhibit polymerization in the reaction system.

2. A process as in claim 3 wherein the quantity of ferrous ions employed is at least about 50 parts per million based on the weight of the reaction mixture.

3. In a process for hydrolyzing an α,β-ethylenically unsaturated nitrile selected from the group consisting of acrylonitrile and methacrylonitrile to a corresponding α,β-ethylenically unsaturated amide sulfate which comprises the step of reacting said nitrile with concentrated sulfuric acid at a temperature within the range from about 50° to 110° C. and in the presence of a polymerization inhibitor for the system whereby said amide sulfate is produced, the improvement which consists in conducting said hydrolysis reaction under an atmosphere substantially free of oxygen and in the presence of (1) from about 50 up to about 2000 parts per million of a phenol based on the weight of the nitrile, said phenol being soluble in the nitrile and having at least one of the ring positions ortho and para to a hydroxy group occupied by a hydrogen atom and (2) a sufficient quantity of ferrous ions to inhibit polymerization in the reaction system.

4. A process as in claim 3 wherein the phenol is resorcinol.

5. A process as in claim 3 wherein the phenol is phloroglucinol.

(References on following page)

References Cited in the file of this patent

UNITED STATES PATENTS

| | | |
|---|---|---|
| 2,472,811 | Dickey | June 14, 1949 |
| 2,486,190 | Minsk et al. | Oct. 25, 1949 |
| 2,504,070 | Jones | Apr. 11, 1950 |
| 2,683,173 | Weisgerber | July 6, 1954 |
| 2,840,611 | Bikales et al. | June 29, 1958 |
| 2,957,914 | Halpern et al. | Oct. 25, 1960 |

OTHER REFERENCES

Noller: Chemistry of Organic Compounds, 2nd ed., page 508 (1957).

UNITED STATES PATENT OFFICE
CERTIFICATE OF CORRECTION

Patent No. 3,130,229　　　　　　　　　　　April 21, 1964

Ralph E. Friedrich et al.

It is hereby certified that error appears in the above numbered patent requiring correction and that the said Letters Patent should read as corrected below.

Column 6, line 51, for the claim reference numeral "3" read -- 1 --.

Signed and sealed this 27th day of October 1964.

(SEAL)
Attest:

ERNEST W. SWIDER　　　　　　　　　　　　　EDWARD J. BRENNER
Attesting Officer　　　　　　　　　　　　Commissioner of Patents